Figure 1:
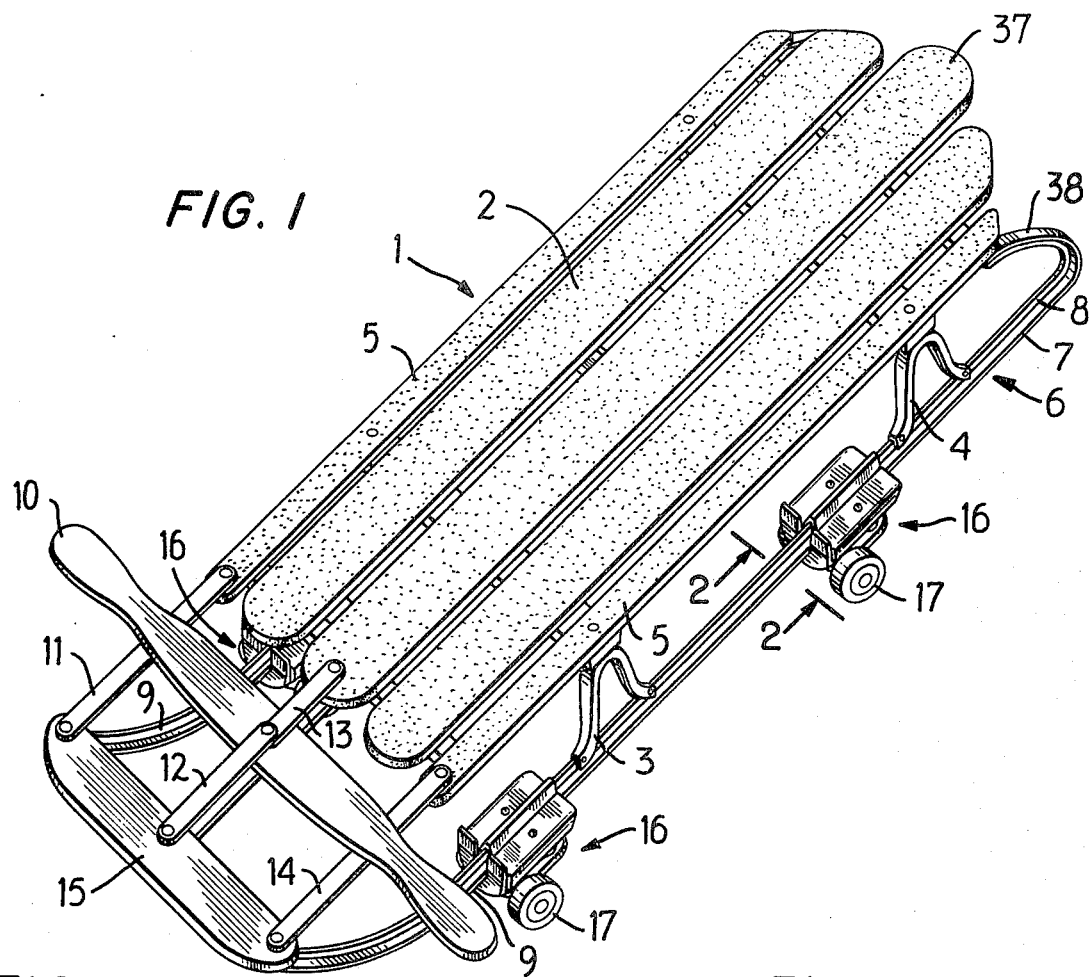

United States Patent [19]

Dredger et al.

[11] 4,046,392
[45] Sept. 6, 1977

[54] ROLLER SLED

[76] Inventors: Edward Dredger, 2752 E. 22nd St.; Thomas Passantino, 26-42 E. 7th St., both of Brooklyn, N.Y. 11235

[21] Appl. No.: 704,412

[22] Filed: July 12, 1976

[51] Int. Cl.² ............................................. B62B 13/18
[52] U.S. Cl. ........................................ 280/8; 248/228
[58] Field of Search ............... 280/7.12, 8, 7.13, 12 A, 280/11.37 J; 248/228; 403/384, 387

[56] References Cited
U.S. PATENT DOCUMENTS

| 1,380,660 | 6/1921 | Leicht | 280/8 |
| 1,546,805 | 7/1925 | St Pierre | 280/8 |
| 2,024,423 | 12/1935 | Brunetti | 280/8 |
| 2,098,722 | 11/1937 | Depovsek | 280/7.12 |
| 2,236,331 | 3/1941 | Cofsky | 280/8 |

FOREIGN PATENT DOCUMENTS 2,322,211  11/1973  Germany .............................. 280/12

Primary Examiner—Joseph F. Peters, Jr.
Assistant Examiner—David M. Mitchell
Attorney, Agent, or Firm—Brumbaugh, Graves, Donohue & Raymond

[57] ABSTRACT

An improved roller sled is provided with simple and inexpensive removable clamping members for the roller wheels, which members are slidably mounted and locked together without the use of bendable and shearable bolts and nuts. Preferably the roller sled is further provided with dampened pivotal roller wheels and a friction coated bed.

6 Claims, 6 Drawing Figures

U.S. Patent   Sept. 6, 1977   Sheet 2 of 3   4,046,392

ROLLER SLED

The present invention relates to a sled and more particularly to an improved roller sled.

Sleds have provided enjoyment over the years for both young and old persons in the snow belt areas during the winter time. However, sleds are useless in the snow belt areas when there is no snow on the ground and are equally useless in southern areas which are free of snow even in the winter time. As a consequence thereof, sleds are only usable in certain limited areas of the country and then only on a seasonal basis.

It has been proposed heretofore to provide sleds with roller wheels, one set of roller wheels being removably mounted at the rearward portion of each runner and one set of roller wheels being removably mounted on the forward flexible portion of each runner so as to enable the sled to be steerable and usable on paved surfaces when there is no snow on the ground. The heretofore proposed roller sleds, however, suffer from a number of disadvantages which have therefore not enabled them to be of any commercial significance.

The primary disadvantage to the heretofore proposed roller sleds lies in the means for removably clamping the roller wheels to the sled runners. Such heretofore known clamping means are of complex construction and hence expensive. Moreover, they are dependent upon the use of threaded bolts and nuts to join and lock the two members of the clamping means together. As a consequence, the means for joining and locking the two clamping members together become bent in use or even shear apart due to the concentrated stresses to which they are subjected so as to render the clamping members useless and causing injury to the user.

A further disadvantage to the known roller sleds is that they are difficult to steer.

Another disadvantage of the heretofore known roller sleds is that it is difficult to maintain the body of the user on the bed of the sled when making sharp turns, because the user is prone to be thrown sideways off of the sled due to centrifugal force and momentum and thereby cause abrasion or other bodily injury to the user.

It is, therefore, the principal object of the present invention to provide a roller sled having simple and inexpensive removable clamping means wherein the members of the clamping means are not joined and locked together by threaded bolts and nuts which are subject in use to bending and shearing. A further object of the present invention is to provide a roller sled preferably having dampened pivotal roller wheels so that the user can more easily steer the roller sled. Another object of the present invention is to provide a roller sled preferably having a bed with an upper surface which enables the user to maintain his or her position easily on the sled even during sharp turns.

In general, the roller sled of the present invention comprises a conventional sled having roller wheels mounted thereon by novel clamping means. Thus, the roller sled comprises a bed, a pair of forward and rearward braces which are attached adjacent each side of the bed and extend downwardly therefrom. An inverted T-shaped runner formed of a lower runner blade and an upper ridge is attached to each pair of braces and has a flexible portion forward of the forward brace. A steering bar is linkably connected to the bed of the sled and to the flexible portion of each runner. Means are provided for removably clamping and mounting the roller wheels onto the runners forward of each of the forward braces and adjacent each of the rearward braces.

The removable clamping means comprise an upper member and a lower member having one or more roller wheels, preferably two for stability, rotatably mounted thereon. The upper member has a longitudinal centrally located groove closely fitting the runner ridge and a downwardly extending flange at the rear end thereof having a central notch. The lower member has a longitudinal centrally located groove closely fitting the runner blade and an upwardly extending flange at the forward end thereof having a central notch. The rear flange of the upper member abuts against the rear end of the lower member and the forward flange of the lower member abuts against the forward end of the upper member when the clamping means is assembled. Either the upper member or the lower member has a flange along each side thereof which is lockably engaged with the corresponding side of the other member. If desired, the upper and lower members can conveniently have aligned holes with registration pins therein.

In a preferred embodiment of the invention, the lower member of the clamping means has dampened pivotal roller wheels. In another preferred embodiment of the invention, the bed of the roller sled has an upper surface with a nonslip or friction coating thereon.

Figure 2:
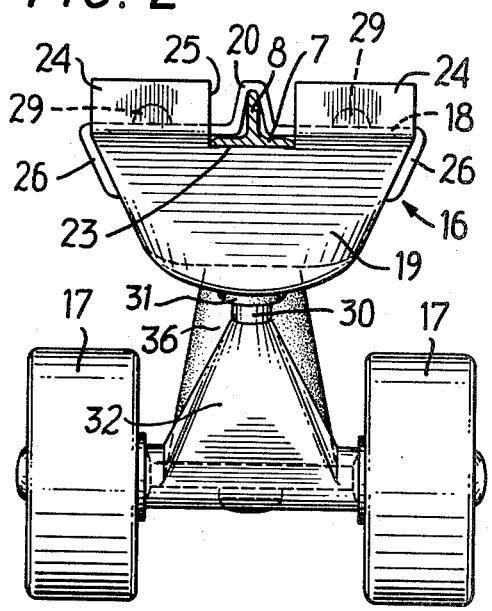
Figure 3:
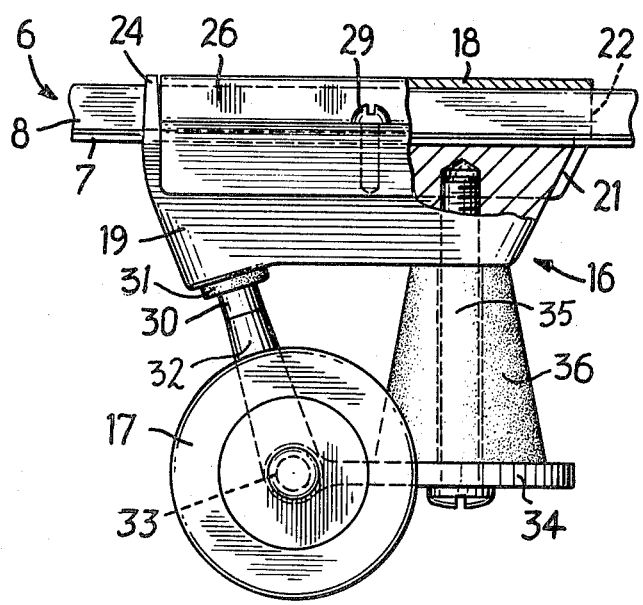
Figure 4:
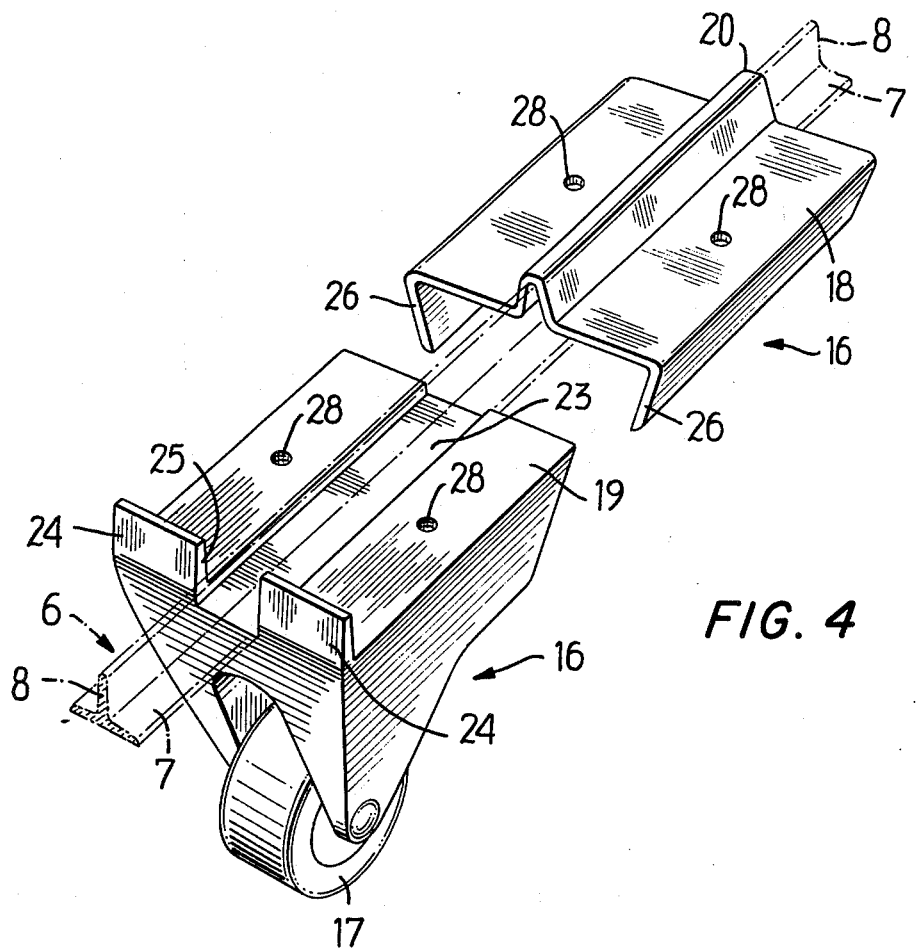
Figure 5:
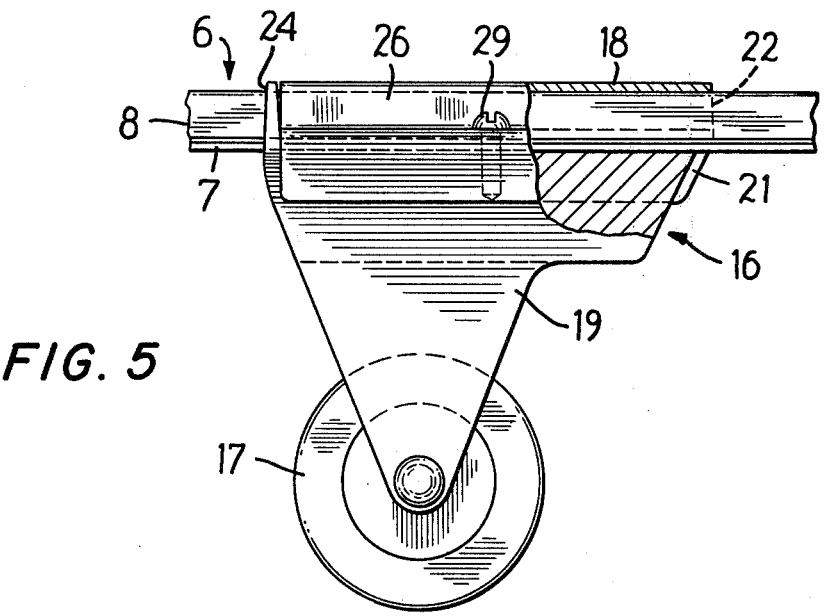
Figure 6:
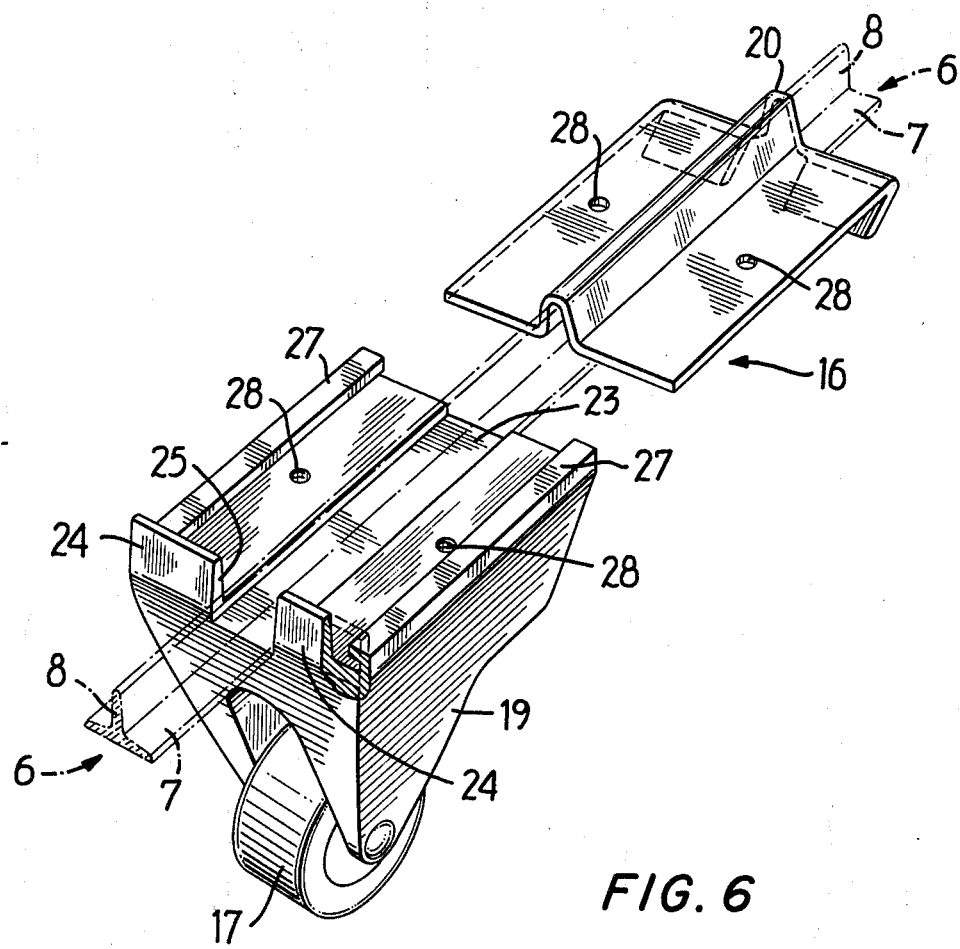

The roller sled of the invention is further illustrated by the accompanying drawing showing various embodiments thereof, wherein, FIG. 1 is a perspective view of the roller sled of the invention, FIG. 2, taken at line 2—2 of FIG. 1, is a front elevational view of one embodiment of the invention for removably clamping the roller wheels to the sled runner, FIG. 3 is a side elevational view, partly in section, of the removable clamping means embodiment shown in FIG. 2, FIG. 4 is an exploded perspective view of another form of the removable clamping means of the invention, FIG. 5 is a side elevational view, partly in section, of the assembled clamping means shown in FIG. 4, and FIG. 6 is an exploded perspective view of a further variation of the removable clamping means of the invention.

Referring to FIG. 1 of the drawings, the roller sled 1 comprises a bed 2, usually made of wood. A pair of forward 3 and rearward 4 metal braces are attached adjacent each side 5 of the bed 2 and extend downwardly therefrom. An inverted T-shaped metal runner 6 is formed of a lower runner blade 7 and an upper ridge 8 which is attached to each pair of braces 4 and 5 and has a flexible portion 9 forward of the forward brace 3. A wooden steering bar 10 is connected via metal and wooden linkages 11, 12, 13, 14 and 15 to the bed 2 and to the flexible portion 9 of each runner 6. Means 16 for removably clamping roller wheels 17 onto the runners 6 are mounted forward of each of the forward braces 3 and adjacent the rearward braces 4, i.e., forward or behind or between the arms of the rearward braces 4.

The removable clamping means 16 shown in FIGS. 1-6 can be made of metal, reinforced plastics, etc., and comprise an upper member 18 and a lower member 19. The lower member 19 has one or more, preferably two for stability, roller wheels 17 rotatably mounted thereon. The upper member 18 has a longitudinal central groove 20 which closely fits the runner ridge 8 and has a downwardly extending flange 21 at the rear end thereof which is provided with a central notch 22. The lower member 19 of the clamping means 16 has a longitudinal central groove 23 which closely fits the runner blade 7 and also has an upwardly extending flange 24 at the forward end thereof which is provided with a central notch 25. When the clamping means 16 are assembled (FIGS. 1–3, 5), the rear flange 21 of the upper member 18 abuts against the rear end of the lower member 19 and the forward flange 24 of the lower member 19 abuts against the forward end of the upper member 18.

One of the two members 18 or 19 of the clamping means 16 has a flange along each side thereof which lockably engages the corresponding side of the other member 19 or 18. As shown in FIGS. 1–5, the upper member 18 has a downwardly extending and inwardly directed flange 26 along each side thereof which lockably engages each inwardly tapered corresponding side of the lower member 19. Referring to FIG. 6, which represents another variation of the clamping means of the invention, the lower member 19 has an upwardly directed and inwardly bent flange 27 along each side thereof which lockably engages each corresponding side of the upper member 18.

As shown in FIGS. 1–6, if desired, the upper 18 and lower 19 members of the clamping means 16 can have aligned (threaded or unthreaded) holes 28 through which metal registration pins 29 (threaded or unthreaded) are inserted.

In a preferred embodiment of the invention shown in FIGS. 1–3, the lower member 19 of the clamping means 16 is provided with means for pivoting the roller wheels and means for dampening said pivotal means. Thus, a pivot rod 30 is pivotally mounted at its upper end in a cup or socket 31 attached to the lower member 19. The pivot rod 30 is connected at its lower end to an axle housing 32. An axle 33 for the roller wheels 17 pases through the axle housing 32 and a dampener arm 34 extends rearwardly from the axle housing 32. A kingpin 35 is surrounded by a rubber bushing or dampener 36 and joins the dampener arm 34 to the lower member 19. Such dampened pivotal roller wheels render the roller sled easier to steer, since they operate in the same fashion as the roller wheels for the now popular skate boards. In another preferred embodiment of the invention shown in FIG. 1, the bed 2 of the roller sled 1 has an upper surface which is provided with a nonslip or friction coating 37 thereon, such as an outdoor or all weather carpeting material, adhered particles or the like.

The clamping means 16 of the invention are removably mounted upon the runners 6 of the roller sled 1 by placing the upper member 18 on the ridge 8 of the runner 6 so as to have its longitudinal central groove 20 and central notch 22 aligned along the ridge 8 of the runner 6. The lower member 19 of the clamping means 16 is inserted below the runner 6 and forward of the upper clamping member 18 (See FIGS. 4 and 6) so as to have the longitudinal central groove 23 and the central notch 25 in the lower member 19 placed along the blade 7 of the runner 6. The upper 18 and lower 19 members are then slid completely together so as to lockably engage the flange 26 or 27 along each side of one of the members with the corresponding side of the other member. These two members 18 and 19 are so slid together until the rearward flange 21 of the upper member 18 abuts against the rear end of the lower member 19 and the forward flange 24 of the lower member 19 abuts against the forward end of upper member 18. If desired, registration pins 29 are then inserted into the aligned holes 28. The clamping means 16 are removably dismounted by reversing the above mounting procedure.

It will be noted that the clamping means 16 and roller wheels 17 are mounted forward of the forward braces 3 and adjacent the rearward braces 4 supporting the sled runners 6 and consequently when the sled 1 is in use, the clamping means 16 are retained in place along the runners 6 due to their close fit and can slip rearward, if at all, only until they touch the forward braces 3 or an arm of the rearward braces 4 or the safety bend 38 of the runners 6. In view of the fact that the lower clamping member 19 has an upwardly extending flange 24 at the forward end thereof and the upper clamping member 18 has a downwardly extending flange 21 at the rear end thereof, the normal forward motion of the sled 1 against a paved surface with the attendant rearward frictional force vector constantly keeps the two clamping members 18 and 19 in engagement with one another so that they do not pull apart when the sled is in normal forward motion even without the presence of the registration pins 29 in the aligned holes 28. However, the use of the registration pins 29 enables the sled to be operated in reverse direction during trick sledding without unlocking the upper 18 and lower 19 clamping members should they tend to slip apart. Moreover, since the flanges 21 and 24 absorb and evenly distribute the frictional force vectors, in normal forward motion, the registration pins 29, when used, are not subjected to any concentrated bending or shearing forces and hence can be easily and repeatedly placed into and removed from the aligned holes 28.

The provision of dampened pivotal roller wheels 17 enables the user to steer the roller sled 1 more easily by shifting his body weight to one side or the other side of the bed 2 of the roller sled 1. Moreover, the provision of an all weather nonslip or friction surface 31 on the bed 2 of the roller sled 1 enables a user to maintain his or her position on the sled 1 even when making sharp turns so as to thereby avoid being thrown off the sled 1 and causing abrasion or other bodily injury.

We claim:

1. A roller sled comprising a bed, a pair of forward and rearward braces attached adjacent each side of said bed and extending downwardly therefrom, an inverted T-shaped runner formed of a lower runner blade and an upper ridge attached to each pair of braces and having a flexible portion forward of said forward brace, a steering bar linkably connected to said bed and to said flexible portion of each runner, and removable clamping means for mounting roller wheels onto said runners forward of each of said forward braces and adjacent said rearward braces; said removable clamping means comprising an upper member and a lower member having at least one roller wheel rotatably mounted thereon, said upper member having a longitudinal central groove closely fitting said runner ridge and a downwardly extending flange at the rear end thereof having a central notch, said lower member having a longitudinal central groove closely fitting said runner blade and an upwardly extending flange at the forward end thereof having a central notch, said rear flange of the upper member abutting against the rear end of said lower member and said forward flange of the lower member abutting against the forward end of said upper member, one of said two members having means along each side thereof for lockably engaging the corresponding side of the other member.

2. The roller sled as defined by claim 1 wherein said upper member has means along each side thereof for lockably engaging the corresponding side of the lower member.

3. The roller sled as defined by claim 1 wherein said lower member has means along each side thereof for lockably engaging the corresponding side of the upper member.

4. The roller sled as defined by claim 1 wherein said upper and lower members have aligned holes with registration pins therein.

5. The roller sled as defined by claim 1 wherein said lower member has means for pivoting the roller wheels and means for dampening said pivotal means.

6. The roller sled as defined by claim 1 wherein said bed has an upper surface with a friction coating thereon.

* * * * *